United States Patent [19]

Bjorklund et al.

[11] Patent Number: 4,533,211

[45] Date of Patent: Aug. 6, 1985

[54] FREQUENCY MULTIPLEXED OPTICAL SPATIAL FILTER BASED UPON PHOTOCHEMICAL HOLE BURNING

[75] Inventors: Gary C. Bjorklund, Los Altos; Glenn T. Sincerbox, San Jose, both of Calif.

[73] Assignee: International Business Machines Corporation, Armonk, N.Y.

[21] Appl. No.: 462,724

[22] Filed: Jan. 31, 1983

[51] Int. Cl.³ ..................... G01N 21/25; G06G 9/00
[52] U.S. Cl. .......................... 350/162.12; 350/320; 364/822
[58] Field of Search ................. 350/162.12, 162.13, 350/162.14, 162.15, 320; 356/71; 364/822; 382/10, 31

[56] References Cited

PUBLICATIONS

Introduction to Fourier Optics by J. W. Goodman, McGraw Hill 1968, pp. 141–197.
"Phototropy (or Photochromism)" by Exelby and Grinter, Chem Reviews G5 (2), p. 247, 1965.
"Molecular Structure and Properties of Liquid Crystals" by G. W. Gray, Academic, New York 1962.
Phys. Rev. Lett. 42, pp. 788–791 (1979), "Photochemical and Population Hole Burning in the Zero-Phonon Line of a Color Center-$F_3^+$ in NaF" by Macfarlane et al.
Appl. Phys. 25 p. 87 (1981), "Thin Film Aggregate Color Centers as Media for Frequency Domain Optical Storage" by Ortiz, et al.

*Primary Examiner*—Bruce Y. Arnold
*Attorney, Agent, or Firm*—Joseph E. Kieninger; Henry E. Otto, Jr.

[57] ABSTRACT

A frequency multiplexed optical spatial filter is based upon a thin film of a photochemical hole burning material. The filter stores a plurality of images in the photochemical hole burning medium. The images are formed at different optical frequencies and coexist in the same volume of the storage medium. Individual images are accessed by changing the frequency of the illuminating radiation.

9 Claims, 3 Drawing Figures

MASTER #1
EXPOSED AT FREQUENCY $\omega_1$

MASTER #2
EXPOSED AT FREQUENCY $\omega_2$ a) MASTER TRANSPARENCY b) EXPOSED SAMPLE ILLUMINATION AT FREQUENCY $\omega_1$ ILLUMINATION AT FREQUENCY $\omega_2$ c) INTENSITY PATTERN TRANSMITTED BY SAMPLE

TRANSMITTIVITY VS OPTICAL FREQUENCY FOR EACH REGION ON EXPOSED SAMPLE

FREQUENCY MULTIPLEXED OPTICAL SPATIAL FILTER BASED UPON PHOTOCHEMICAL HOLE BURNING

DESCRIPTION

TECHNICAL FIELD

This invention relates to optical spatial filters and more particularly to frequency multiplexed optical spatial filters based upon photochemical hole burning materials.

BACKGROUND ART

Optical spatial filters have been of great importance for optical information processing systems. They are described at length in the *Introduction to Fourier Optics* by J. W. Goodman, McGraw Hill, 1968, pages 141-197. In these systems the synthesis of the desired linear systems response is typically accomplished by inserting in the optical beam path precisely positioned spatial filters with carefully designed spatially varying transmissivities. Changing these filters, however, requires a significant period of time which results in measurements taken with different filters being a relatively slow procedure.

There has been considerable research on optical materials whose spatial varying transmissive properties can be changed in real time. These include photochromic materials such as those described by R. Exelby and R. Grinter in Chem Reviews G5 (2), page 247 (1965) and liquid crystals such as described by G. W. Gray in "Molecular Structure and Properties of Liquid Crystals" Academic, New York 1962. Changeable spatial filters could be constructed from these materials. However, such filters would have several disadvantages. One disadvantage is that the rate at which filter functions could be changed would be of the order of milliseconds at best. A second disadvantage would be that every time a particular filtering function would be desired, that function would have to be completely rewritten, since the medium would have no memory of previously used filter functions.

SUMMARY OF THE INVENTION

It is a primary object of this invention to provide an improved optical spatial filter.

It is another object of this invention to provide a multiplexed optical spatial filter.

It is still another object of this invention to provide an optical spatial filter in which the filtering function can be changed in microseconds.

These and other objects are accomplished with a frequency multiplexed optical spatial filter based upon a thin film of a photochemical hole burning material such as aggregate color centers contained in alkali halide hosts. (Reference: Macfarlane, R. M., Shelby, R. M., Phys. Rev. Lett. 42, 788 (1979); Orl:2, c., Macfarlane, R. M., Shelby, R. M., Lenth, W. and Bjorklund, G. C., Appl. Phys. 25, 87 (1981)) The filter stores a plurality of images in the photochemical hole burning storage medium. The images are formed with current tuned lasers at different optical frequencies and coexist in the same volume of the storage medium. The individual images are accessed by changing the frequency of the illuminating radiation to correspond to the recording frequency.

A specific example of a frequency modulated multiplexed spatial filter is the $R_2$ center in LiF having a spectral hole burned therein with a GaAlAs laser at an optical frequency within the 8330A zero phonon line. Specific examples in which the frequency multiplexed filter may be used are optical character recognition and optical image processing.

Other objects of this invention will be apparent from the following detailed description, reference being made to the following drawings in which specific embodiments of the invention are shown.

DESCRIPTION OF THE PREFERRED EMBODIMENT

Figure 1:
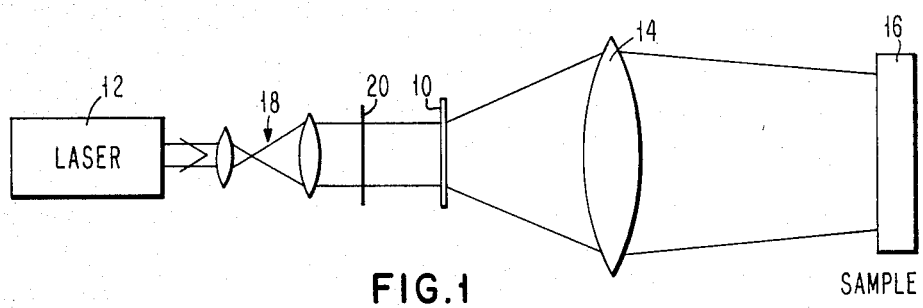
FIG. 1 is a schematic view of a typical system for producing the frequency multiplexed optical spatial filter.

A thin film of photochemical hole burning material is used to produce frequency multiplexed optical spatial filters. This material allows up to 1000 different spatial filters to be stored in the same physical location. This also permits nonmechanical selection of a particular spatial filter in microseconds using rapidly tunable lasers such as current-tuned GaAlAs diode lasers.

The frequency selective optical spatial filter element is produced by irradiating a solid state sample that exhibits spectral hole burning with a multiplicity of exposure patterns of incident optical irradiation. The solid state sample contains molecules of a photo-active species that provide a strong inhomogeneously broadened absorption band into which narrow spectral holes can be burned. Each exposure pattern consists of a carefully chosen variation in optical intensity across the plane of the solid state sample and is carried by monochromatic light at a unique assigned optical frequency within the absorption band. Since the depth of the spectral hole burned at a given optical frequency depends on the optical intensity, each exposure pattern is recorded by a spatial variation of the depth of the hole burned at its assigned optical frequency.

The spectral hole burning process occurs when a subset of the population of active species molecules is excited by narrow-band optical radiation tuned to a particular frequency within the homogeneously broadened absorption band. Only those molecules whose local environment is such that their resonant frequency is within a homogeneous linewidth of the incident optical radiation frequency are excited. The excited molecules subsequently undergo either photochemical or photophysical transformation to become species that absorb at frequencies well outside of the absorption band (photochemical case) or at other locations within the absorption band (photophysical case) or at other locations within the absorption band (photophysical case). The depletion of the population of the selected subset of molecules produces a dip or spectral hole in the inhomogeneous absorption band with a width on the order of the homogeneous linewidth. Typical ratios of inhomogeneous to homogeneous linewidths are on the order of 1000, so up to 1000 resolvable holes can be burned in a single absorption band. Particular examples of materials systems that have been demonstrated to undergo such hole burning processes are aggregate color centers in alkali-halide or alkaline earth-halide hosts where the specific photochemical transformation is photoinduced electronic tunneling to nearby traps and porphin-like molecules in organic crystalline or polymer hosts where the specific photochemical transformation is photoinduced tautomerism mediated by decay through metastable triplet states.

The optical properties of the sample are altered by the hole burning process. Those spatial areas of the sample that contain spectral holes burned at particular optical frequencies will have enhanced transmissivity for optical frequencies within the widths of the holes. Thus the exposed sample has a separate and distinct spatially varying transmissivity pattern for each of the assigned optical frequencies. By suitably varying the details of the initial exposure patterns, the transmissivity patterns of the exposed sample can be designed to produce the desired spatial filtering functions.

As shown in FIG. 1, these filters are produced by illuminating a series of master transparencies 10 with the coherent output of a high power narrow band tunable laser source 12 and then passing the transmitted light through an imaging system 14 onto a sample 16 consisting of a thin film of material which exhibits photochemical hole burning. Light from the laser 12 passes through a telescope 18 and shutter 20 prior to passing through the master transparency 10. Each master transparency 10 has a unique spatial varying transmissivity which corresponds to a desired spatial filtering function. The relayed light distribution may be either a direct image or modification of the image such as the Fourier transform of the master transparency. The laser 12 is tuned to a particular optical frequency within the imhomogeneously broadened photochemical active zero phonon line of the sample 16, a selected master transparency 10 is inserted, and the light shutter 20 is open. The sample 16 is thus exposed to the appropriate light distribution from the master transparency 10 and this image is recorded in terms of a spatial variation of the depth of the photochemical hole burned at that particular frequency. The shutter 20 is then closed, the laser 12 is tuned to a different optical frequency within the zero phonon line, a different master transparency 10 is inserted and the recording process is repeated.

Thus, the image of each master transparency 10 is recorded in terms of a spatial variation of the depth of the photochemical hole burned at the particular laser frequency corresponding to that transparency. Once the sample 16 had been exposed in this manner, the frequency multiplexed optical spatial filter has been produced.

The burning of a photochemical hole at a particular optical frequency enhances the transmissivity of the sample for a narrow band of frequency centered about that frequency. Thus, the multiplex filter will provide an optical intensity spatial filtering function which corresponds to that of any selected one of the master transparencies 10 when illuminated with the light at the appropriate frequency. Provided that the spacing between the optical frequencies of which the master transparencies 10 are recorded is greater than the photochemical hole width, there will be no significant cross talk between the multiplexed filters. Since the frequency width of the photochemical holes is typically a factor of 1000 less than the width of the zero phonon line, up to 1000 filters can be multiplexed in a single sample 16.

The requirements on the photochemical hole burning medium 16 are that it be compatible with practical laser sources 12, be capable of fabrication in thin films with good optical quality, have zero phonon lines with sufficient oscillator strength that an optical density of at least 1.0 can be achieved in thin films, and exhibit sufficiently complete photochemistry that 50% deep holes can be burned. Most of these requirements are met by media consisting of aggregate color centers contained in alkali halide hosts. For instance, these media have been demonstrated to exhibit photochemical hole burning in the GaAlAs laser range (at 8330A for the $R'_2$ center in LiF), have sufficiently strong zero phonon lines to produce optical densities greater than 1.0 in 20 $\mu m$ thick samples (the 8377A line of the $N_1$ center in NaCl), and can be fabricated in thin films. Typical hole widths are on the order of 50 MHz and typical inhomogeneous zero phonon linewidths are on the order of 100 GHz.

In the case that the photochemistry is not complete enough to burn 50% deep holes, the contrast can still be enhanced by making use of the induced birefringence which accompanies photochemical hole burning in some materials (see M. D. Levenson et al, Phys. Rev. B22, 4915 (1980)). High contrast is then obtained by placing the multiplexed spatial filter between crossed polarizers.

The requirements on the laser 12 used to expose the sample 16 to produce the multiplexed filter are that it have sufficient power to produce photochemical hole burning with an unfocused beam, that it have a bandwidth less than the hole width, that its frequency be stable over the time necessary to burn a hole, and that it be tunable over the entire zero phonon line. Rapid tunability of this laser is not required. For aggregate color center media, these requirements become a total power of several hundred milliwatts (for a 1 $cm^2$ sample area and 5 minute exposure time), a bandwidth less than 50 MHz, a frequency stability of less than 50 MHz drift in 5 minutes, and 100 GHz of tunability. These requirements are easily satisfied by commercially available actively stabilized dye lasers.

The requirements on the laser illumination source 12 for utilization of the multiplexed filter are that it be rapidly tunable, that it have a bandwidth less than the hole width, that its frequency be stable over the desired observation time, and that it be tunable over the entire zero phonon line. High output power is not required. Current tuned GaAlAs lasers satisfy the bandwidth and stability requirements and offer microsecond random access over 75 GHz of optical frequency.

Figure 2:
FIG. 2 illustrates an example of the master transparencies, the exposed photochemical hole burning sample, the intensity pattern transmitted by the sample and the transmissivity versus optical frequency relationship for the samples.
Figure 2:
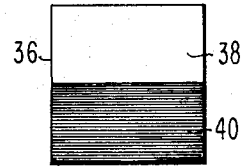
Figure 2:
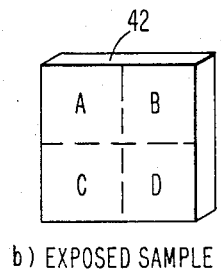
Figure 2:
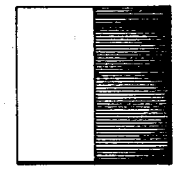
Figure 2:
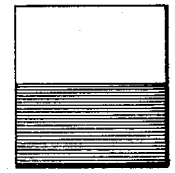
Figure 2:
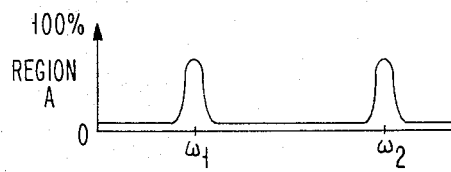
Figure 2:
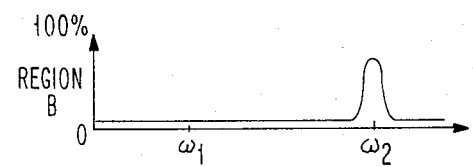
Figure 2:
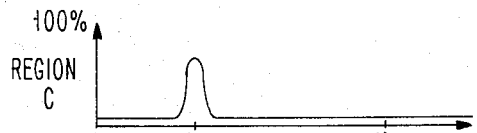
Figure 2:
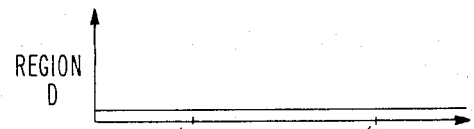

An illustrative example is shown in FIG. 2. Master transparency #1 in FIG. 2A consists of a square 30 divided vertically into an opaque 32 and a transparent region 34 and is recorded at optical frequency $\omega_1$. Master transparency #2 in FIG. 2A consists of a square 36 divided horizontally into an opaque 38 and transparent region 40 and is recorded at optical frequency $\omega_2$. The multiplexed filter 42 in this case has four distinct regions (A, B, C, and D), each of which has a different optical intensity transmission as a function of optical frequency. When uniformly illuminated with light at frequency $\omega_1(\omega_2)$, the multiplexed filter 42 transmits light with a spatial intensity variation corresponding to that of transparency #1 (#2) as shown in FIG. 2C. In FIG. 2D the relationship between the transmissivity and the optical frequency for each region (A, B, C and D) of the exposed sample is shown.

Figure 3:
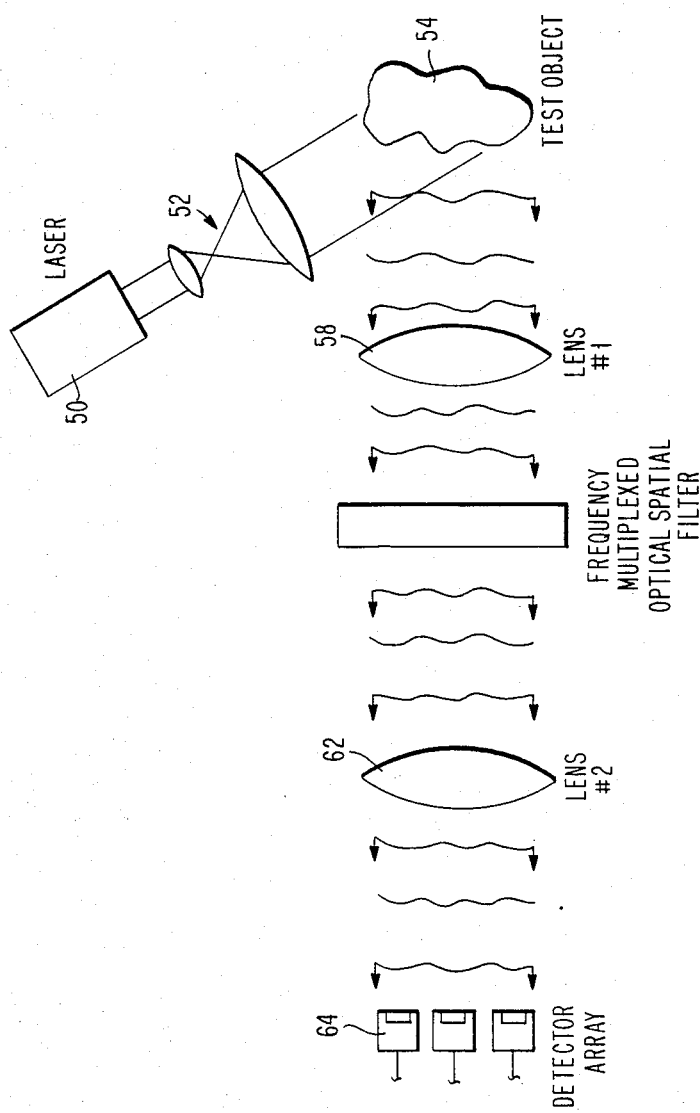
FIG. 3 is a schematic view of a system utilizing the frequency multiplexed spatial filter.

FIG. 3 shows a preferred method for utilization of the device for spatial filtering of the light scattered by a test object. In this case a rapidly tunable laser 50 is utilized together with a telescope 52 to illuminate the test object 54. The light 56 scattered by object 54 is collected by a lens 58 and directed through the frequency multiplexed spatial filter 60, collected by lens 62 and monitored by detector array 64. Since the frequency of the light scattered by the object is the same as the laser frequency, the desired spatial filtering function is selected by tuning the laser.

The ability of the invention of this disclosure to change filtering function in microseconds promises substantial gains in the data rates and flexibility of optical information processing systems. A specific application is optical character recognition. For this case, the test object 54 in FIG. 3 is an alphanumeric character on a printed page or transparency. The multiplexed filter 60 contains matched filters for each of 1000 different possible characters, fonts and orientations. The light transmitted by the multiplexed filter 60 is monitored by a single photodetector placed on the optical axis of the back focal plane of lens 62. Whenever the selected filter function matches the character under observation, the photodetector signal is greatly increased. For each character under test, the rapidly tunable laser is scanned through the entire inhomogeneous absorption line, selecting each of the multiplexed filter functions in a definite sequence. The character is then identified by the timing of the photodetector signal pulse relative to the laser frequency scan.

Another specific application is optical image processing. In this application the test object in FIG. 3 is an imperfect photograph of an object of interest. The multiplexed filter contains filters designed to compensate for various types of camera lens aberrations, film imperfections, etc. The ability to change filtering functions in microseconds makes it possible to rapidly determine the optimal compensating filter.

Although preferred embodiments have been described, it is understood that numerous variations may be made in accordance with the principles of this invention.

We claim:
1. A frequency multiplexed optical spatial filter comprising:
 a plurality of images stored in a photochemical hole burning storage medium, said images formed at different optical frequencies and co-existing in the same volume of said medium.
2. An optical spatial filter as described in claim 1 wherein said storage material is an alkali halide containing color centers.
3. An optical spatial filter as described in claim 1 wherein said storage material is LiF containing color centers.
4. An optical spatial filter as described in claim 1 wherein said storage material is NaCl containing color centers.
5. A pattern recognition system comprising:
 a frequency multiplexed optical spatial filter including a plurality of images stored in a photochemical hole burning storage medium, said images formed at different optical frequencies and coexisting in the same volume of said medium,
 means for illuminating said medium with a first optical frequency with an unknown image, and
 means for comparing said unknown image with said plurality of images by altering said first optical wavelength.
6. A pattern recognition system as described in claim 5 wherein said illuminating means is a laser.
7. A pattern recognition system as described in claim 5 wherein said illuminating means is a GaAlAs laser.
8. A pattern recognition system as described in claim 5 wherein said comparing means is a photodetector.
9. A method of pattern recognition comprising the steps of
 storing a plurality of known images in a photochemical hole burning storage medium, said images formed at different optical frequencies and co-existing in the same volume of said medium,
 illuminating said storage medium with a first optical frequency with an unknown image, and
 comparing said unknown image with said plurality of images by altering said first optical frequency.

* * * * *

Disclaimer 4,533,211.—*Gary C. Bjorklund*, Los Altos, and *Glenn T. Sincerbox*, San Jose, Calif. FREQUENCY MULTIPLEXED OPTICAL SPATIAL FILTER BASED UPON PHOTOCHEMICAL HOLE BURNING. Patent dated Aug. 6, 1985. Disclaimer filed June 2, 1986, by the assignee, *International Business Machines Corp.*

Hereby enters this disclaimer to claims 1, 2, 4–6, 8 and 9 of said patent.
[*Official Gazette August 5, 1986.*]